United States Patent [19]

Russo et al.

[11] 4,262,524

[45] Apr. 21, 1981

[54] INSTRUMENT FOR MEASURING SPONTANEOUS IGNITION IN AN INTERNAL COMBUSTION ENGINE

[75] Inventors: Luigi Russo; Luciano Spaggiari, both of Milan, Italy

[73] Assignee: Alfa Romeo S.p.A., Milan, Italy

[21] Appl. No.: 103,115

[22] Filed: Dec. 13, 1979

[30] Foreign Application Priority Data

Dec. 18, 1978 [IT] Italy .............................. 30970 A/78

[51] Int. Cl.[3] .............................................. G01L 23/22

[52] U.S. Cl. .......................................... 73/35; 73/116

[58] Field of Search .................... 73/35, 116; 324/378, 324/399

[56] References Cited

U.S. PATENT DOCUMENTS

| | | | |
|---|---|---|---|
| 3,030,799 | 4/1962 | Hopkins | 73/35 |
| 3,286,164 | 11/1966 | DeHuff | 324/378 |

*Primary Examiner*—James J. Gill

*Attorney, Agent, or Firm*—Charles E. Brown

[57] ABSTRACT

This invention relates to an instrument for measuring spontaneous ignition in a cylinder of an internal combustion engine. The instrument comprises a logic gate unit, which receives pulses representative of gas ionizations between the plug electrodes and control signals having a repetition period corresponding to a prefixed number of active cycles of the cylinder being checked and a duration corresponding to a prefixed number of passive cycles of the same cylinder during a spontaneous ignition measurement stage. The logic gate unit defines a first counting signal each time it receives a control signal and a second counting signal each time it receives a pulse during the duration of said control signal. First and second counter means receive and count said first and second counting signals, thus providing an indication of the number of measurement stages effected and respectively, of the number of measurement stages, in which spontaneous ignition has occurred.

4 Claims, 2 Drawing Figures

INSTRUMENT FOR MEASURING SPONTANEOUS IGNITION IN AN INTERNAL COMBUSTION ENGINE

This invention relates to an instrument for measuring spontaneous ignition in a controlled ignition internal combustion engine, which is capable of automatically supplying a digital signal indicating the number of spontaneous ignitions which occur during a certain number of measurement cycles.

The purpose of an investigation on spontaneous engine ignition, i.e. mixture ignition in the absence of any spark at the sparking plug, is to determine whether the spark advance is at the preignition advance limit for the heat rating of the sparking plug used. In this respect, as the spark advance increases, the maximum temperature in the combustion chamber increases, with formation of superheated zones and hot points due to deposits, especially on the insulated electrode of the sparking plug, if its heat rating is low. Under these conditions the mixture can preignite, and begin to burn before the spark is struck at the sparking plug. Consequently, if during engine tests it is found that the mixture continues to burn by spontaneous ignition when the spark is removed from the sparking plug, this means that the spark advance is close to or at the limit of the preignition advance.

Spontaneous measurement instruments are known which, as the parameter indicating the phenomenon, use the ionization undergone by the gas between the sparking plug electrodes after the mixture has burnt without the spark being struck at the sparking plug. The ionised gas then conducts, and by way of the sparking plug electrodes closes an electrical circuit comprising a direct current medium voltage generator to earth. The current pulses which are generated in this circuit each time gas ionization occurs in the absence of a spark at the sparking plug are displayed on an oscilloscope, and indicate that spontaneous ignition has occurred. The tests are carried out by operating the engine at a determined rotational speed at which it is considered that spontaneous ignition can occur, with sets of active cycles, in which the spark is regularly struck at the sparking plug with predetermined spark advance, being alternated with sets of passive cycles in which the spark is removed. The instrument indicates on the oscilloscope only if spontaneous ignition does or does not occur during the passive cycles, and the operator himself has to check, possibly by a recording method, the number of measurement stages which have taken place (a measurement stage signifies the combination of a set of active cycles with a set of passive cycles), and then has to count the number of spontaneous ignitions which have occurred during the total of the measurement stages in order to evaluate whether the phenomenon is sporadic, frequent or continuous. The instruments used at the present time are therefore able to indicate whether the engine operates in a spontaneous ignition condition when the spark is removed at the sparking plug, but require a checking operation by the operator in order to evaluate the extent of the phenomenon. This requires a certain commitment by the operator plus a not inconsiderable time, and it is also possible for evaluation errors to arise.

The object of the present invention is an instrument able to automatically measure the quantities concerned, and to provide the relative data in numerical form such as to require only limited attention by the operator, and to facilitate the evaluation of the phenomenon.

The instrument according to the invention is provided for measuring spontaneous ignition in a cylinder of an internal combustion engine provided with an ignition system arranged to generate high voltage to be fed intermittently to a sparking plug housed in said cylinder in order to generate mixture ignition sparks for effecting the so-called active cycles of the cylinder being checked, means being provided for blocking the intermittent application of said high voltage to the sparking plug in order to effect the so-called passive cycles of the cylinder being checked, there being connected to said sparking plug a direct current medium voltage generator for supplying the sparking plug, which then allows current to pass each time the gas present between its electrodes is ionized as a result of mixture combustion, there being provided means for detecting said current transmissions, adapter means for transforming the detected current transmissions into corresponding pulses of predetermined form and amplitude, a control circuit for receiving said pulses and to deliver at each predetermined number thereof a control signal of predetermined duration for said blocking means, first selector means associated with said control circuit for causing said predetermined number of pulses to correspond with a required number of active cycles of the cylinder being checked, and second selector means associated with said control circuit for causing said predetermined duration of the control signal to correspond to a required number of passive cycles of the cylinder being checked during a spontaneous ignition measurement stage, said instrument comprising a logic gate unit operationally connected to said adapter means and to said control circuit in such a manner as to receive said pulses and said control signals, said logic gate unit responding to said control signals in such a manner as to be activated to operate for their entire predetermined duration, and to emit for each of them a first counting signal which indicates that one spontaneous ignition measurement stage has been effected, and also responding to each set of pulses received during its activation periods in such a manner as to emit a second counting signal which indicates the existence of spontaneous ignition during a measurement stage, there being associated with said logic gate unit first counter means able to total said first counting signals in order to provide an indication of the number of measurement stages effected, and second counter means able to total said second counting signals in order to provide an indication of the number of measurement stages in which spontaneous ignition has occurred.

In other words, the instrument according to the invention is based on the fact that as the logic gate unit is put into operation by said control signals for predetermined time periods corresponding to the times for effecting the passive cycles of the cylinder being checked, and during these time intervals emits a first counting signal which indicates the effecting of a measurement stage, and in the case of spontaneous ignition emits a second counting signal which indicates that spontaneous ignition has been detected, it enables the first and second counter means associated with it to provide the operator with suitable useful information regarding the number of measurement stages which have been effected and the number of these stages in which spontaneous ignition has occurred. This is an advantage to the operator in terms both of his commitment and of the precision of the measurement.

The characteristics and advantages of the present invention will be more apparent from the detailed description given hereinafter of one embodiment thereof shown by way of example on the accompanying drawings, in which.

Figure 1:
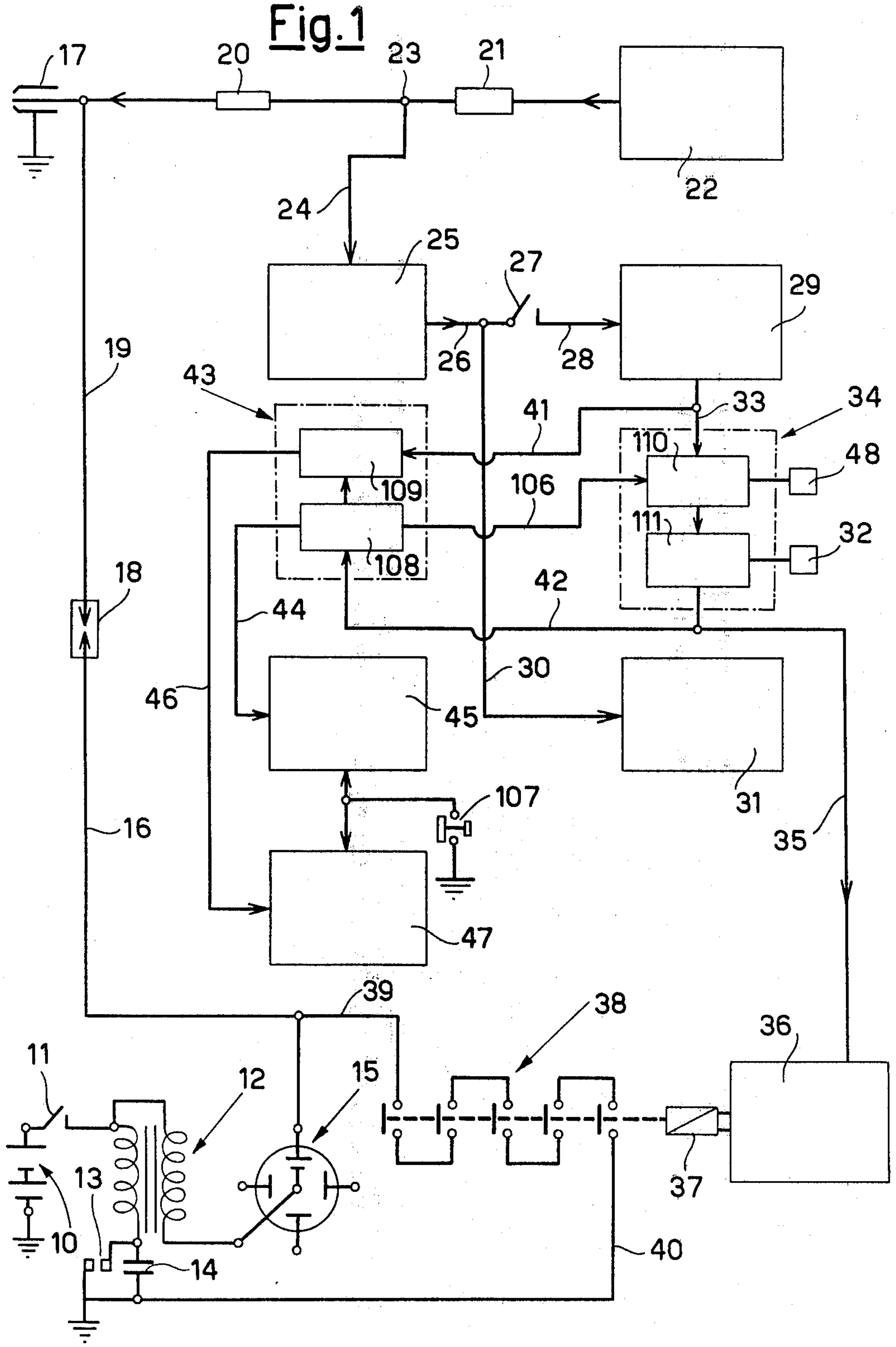
FIG. 1 shows the block diagram of an instrument according to the invention used for measuring spontaneous ignition in an internal combustion engine cylinder.

FIG. 1 shows a normal ignition system for an internal combustion engine, consisting of a battery 10, an ignition switch 11, an ignition coil 12, a contact breaker 13 and a capacitor 14. Said figure includes an ignition distributor 15 of usual type, connected to the coil 12 and to the sparking plugs of the various engine cylinders. A cable 16 from the distributor 15 carries high tension to the sparking plug 17 of the cylinder to be checked, by way of a spark gap 18 and a further cable 19. Two resistors in series branch from the cable 19, the first, of very high value consisting of a high voltage probe and indicated by 20, and the second of much lower value than the first being indicated by 21. The sparking plug 17 is connected by way of the two resistors 20 and 21 to a direct current medium voltage generator indicated by 22, which automatically delivers a current pulse to the sparking plug 17 through the resistors 20 and 21 each time the gas between the electrodes of the sparking plug 17 becomes ionized by the effect of combustion of the mixture (whether this latter is due to a spark provided at the sparking plug 17 or caused by spontaneous ignition), thus completing the circuit comprising the generator 22 and resistors 20 and 21 to earth. The intermediate terminal 23 between the two resistors 20 and 21 is connected by a line 24 to a detection block 25, the purpose of which is to amplify the current pulses appearing at the terminal 23. The block 25 has an output 26 connected through a switch 27 and a line 28 to a block 29 constituted by an adaptor circuit which manipulates the pulse signal emitted by the block 25, in such a manner as to cause the pulses to assume a form and amplitude suitable for their use by the subsequent components of the instrument. The switch 27, which can be operated manually or automatically, is used to switch the instrument on. The output 26 of the block 25 is also connected by a line 30 to a recorder 31 to display in visual form any pulse signal representative of ignition in the cylinder being checked.

The output of the block 29 is connected by the line 33 to the block 34, which itself is connected to manually operable selectors 48 and 32 for establishing the number of active cycles and the number of passive cycles respectively, which the cylinder is required to effect during each measurement cycle under test conditions. The block 34 comprises a control circuit which emits a control signal for each predetermined number of pulses equal to a reference value constituted by the number of active cycles chosen by said selector 48. The duration of said control signal is a function of the time period during which the cylinder effects the number of passive cycles chosen by the selector 32. The block 34 is constituted by a divider 110 with its division ratio adjustable by means of the selector 48, and a monostable multivibrator 111 with its time constant adjustable by means of the selector 32.

The control signal from the block 34 is fed through a first line 35 to a blocking block 36 comprising the activation circuit for the coil 37 of a multi-contact remote control switch 38, which is connected by a conductor 39 to the cable 16 and by a conductor 40 to earth. The contacts of the remote switch 38, which are normally open, are closed by the effect of said control signal, to connect the cable 16 to earth so preventing high voltage at the output of the distributor 15 from reaching it, and thus interrupting the ignition of the sparking plug 17.

The purpose of the previously mentioned spark gap 18 is to keep the cable 16 isolated when the remote control switch 38 is closed.

The output of the block 29 is also connected by a line 41 to a block 43, which also receives the control signal at the output of the block 34 by way of a line 42. The block 43 is constituted by a logic gate unit, which is activated to operate by the control signal generated by the block 34, and thus operates over the time period during which the cylinder effects the passive cycles. The block 43 in fact comprises a first part 108, which is able to emit a first counting signal each time it receives a control signal from the block 34. This first counting signal is fed through a line 44 to a block 45 constituted by a counter which totals the counting signals reaching it and emits a numerical signal which indicates the number of successively effected measurement cycles, as one measurement cycle corresponds to each counting signal.

The logic gate unit 43 also comprises a second part 109, which during the time period in which it is operationally activated by the first part 108 in response to a control signal from the block 34, is able to emit a second counting signal in the presence of the first pulse of any pulse signal from the line 41. This second counting signal is fed by a line 46 to a block 47. This latter is constituted by a counter which is thus able to count each first pulse of any pulse signal from the line 41 during the time period in which the cylinder effects the passive cycles. The presence of at least one pulse in the line 41 during this time period in which the sparking plug is not sparking indicates the existence of spontaneous ignition in the cylinder, while the absence of pulses obviously indicates the absence of spontaneous ignition.

The counter of the block 47 is thus able to emit a numerical signal which indicates the number of measurement stages comprising spontaneous ignition.

It is important to note that the logic gate unit 43 is arranged to respond only to the first of the pulses present in the line 41 during the time period corresponding to the passive cycles, whereas it is insensitive to any pulses subsequent to the first which are present in the line 41 during the same time period. In this manner, each individual counted pulse corresponds to one measurement cycle, and indicates the presence or absence of spontaneous ignition during that cycle.

A comparison between the overall number of measurement stages as totalled by the counter 45 and the number of stages comprising spontaneous ignition as totalled by the counter 47 gives a rapid and reliable evaluation of the intensity of the phenomenon under the prechosen engine test conditions.

Through a line 106, the block 43 feeds to the block 34 a signal for blocking the divider 110 at the beginning of the time period corresponding to the passive cycles, and a switch 107 enables the counters 45 and 47 to be zeroed.

Figure 2:
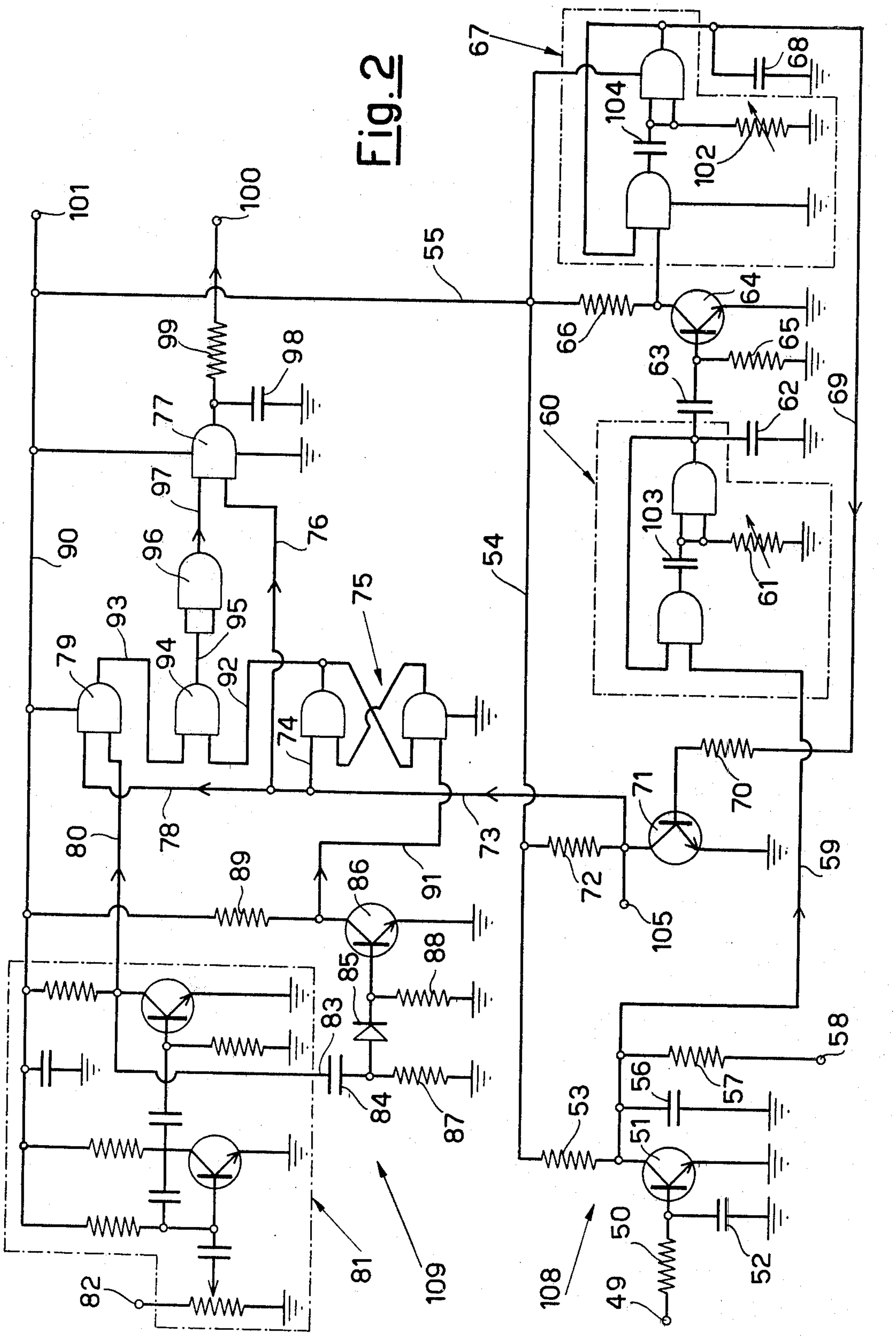
FIG. 2 shows the circuit diagram of the logic gate unit of said instrument.

FIG. 2 shows the circuit diagram of the logic gate unit represented by the block 43 of FIG. 1, the part 108 being illustrated at the bottom and the part 109 at the top of the drawing.

In FIG. 2, the reference numeral 49 indicates the input terminal of the part 108, which is connected to the line 42 of FIG. 1. The terminal 49 is connected via a resistor 50 to the base of an NPN transistor 51 with its emitter earthed, and acting as an inverter. The base of this transistor is connected to earth via a suppressor capacitor 52, and its collector is connected via a resistor 53 to a stabilized voltage direct current supply conductor 54 which is connected to a conductor 55 originating from a terminal 101. The collector of the transistor 51 is also connected to earth via a suppressor capacitor 56, and is connected via a decoupling resistor 57 to an output terminal 58, which is connected to the line 44 of FIG. 1. The collector of the transistor 51 is connected via a conductor 59 to a monostable multivibrator indicated overall by 60. The time constant of the multivibrator 60 depends on the capacity of a capacitor 103 and on the value of a manually set variable resistor 61 forming part of said multivibrator. The output of the multivibrator 60 is connected to earth via a suppressor capacitor 62, and is also connected via a capacitor 63 to the base of an NPN transistor 64 with its emitter earthed, and acting as an inverter. The base of this transistor is connected to earth via a resistor 65, and its collector is connected via a resistor 66 to the supply conductor 54. The collector of the transistor 64 is also connected to a monostable multivibrator 67.

The time constant of the multivibrator 67 depends on the capacity of a capacitor 104 and the value of a manually set variable resistor 102, which form part of said multivibrator. The output of the multivibrator 67 is connected to earth via a suppressor capacitor 68, and is also connected via a conductor 69 and a resistor 70 to the base of an NPN transistor 71 with its emitter earthed, and which acts as an inverter.

The collector of transistor 71 is connected via a terminal 105 to the line 106 of FIG. 1 in order to transmit a blocking signal, at the beginning of each passive cycle stage, to the divider 110 of the block 34. The collector of transistor 71 is connected via a resistor 72 to the supply conductor 54, and is also connected via conductors 73 and 74 to one input of a flip-flop 75. The same conductor 73 is connected via a branch conductor 76 to one input of a coincidence gate (NAND) 77, and is finally connected via a branch conductor 78 to one input of a coincidence gate 79. The second input of the coincidence gate 79 is connected to a conductor 80 which is connected to one output of a two stage squaring amplifier indicated overall by 81, which is not described in detail as it is known to the expert of the art.

The input of the amplifier 81 is constituted by a terminal 82, which is connected to the line 41 of FIG. 1, while its second output constituted by a line 83 is connected via a capacitor 84 to the anode of a diode 85. The anode of said diode is connected to earth via a resistor 85, and its cathode is connected to the base of an NPN transistor 86 with its emitter earthed, and which acts as an inverter. The base of the transistor 86 is connected to earth via a resistor 88, and its collector is connected via a resistor 89 to a stabilised voltage supply conductor 90 from the terminal 101. Finally, the collector of the transistor 86 is also connected via a conductor 91 to the second input of the flip-flop 75. The output of the flip-flop 75 is connected via a conductor 92 to one input of a coincidence gate 94, the second input of which is connected via a conductor 93 to the output of the coincidence gate 79. The output of the coincidence gate 94 is connected via a conductor 95 to the two inputs of a logic inverter 96, and the output of said inverter is connected via a conductor 97 to one input of the coincidence gate 77, the other input of which is connected via the conductor 76 to the conductor 73, as stated. The output of the coincidence gate 77 is connected to earth by way of a condenser 98, and is also connected via a decoupling resistor 99 to an output terminal 100, which is connected to the line 46 of FIG. 1.

When in operation, a control signal reaches the terminal 49 from the control circuit 34 during each measurement stage on termination of the counting of each set of active cycles, the number of which is prechosen by the selector 48 of FIG. 1. The control signal consists of a positive rectangular wave of duration equal to the time during which the engine effects the passive cycles, the number of which is chosen by the selector 32 of FIG. 1.

The positive rectangular wave of the control signal is inverted by the transistor 51 and transmitted negative to the terminal 58, from which it reaches the circuit of the first counter means 45 of FIG. 1. The counter means 45 total the signals received in succession during each measurement stage, and supply a numerical indication of the total number of measurement stages effected during each engine test. The negative rectangular wave generated at the collector of the transistor 51 is also fed via the conductor 59 to the monostable multivibrator 60, which generates at its output a negative rectangular wave of duration dependent on its time constant. The time constant of the multivibrator 60 is adjusted by the resistor 61 in accordance with the inevitable delay in the closure of the contents of the remote control switch 38 of FIG. 1 relative to the rising front of the positive rectangular wave constituting the control signal fed to the coil 37 by the blocking circuit 34 of FIG. 1. The negative rectangular wave signal from the multivibrator 60 is converted by the differential circuit constituted by the capacitor 63 and resistor 65, into a pulse signal comprising a negative pulse corresponding to the falling front of said negative rectangular wave, and a positive pulse corresponding to the rising front of said wave. The positive pulse acts on the base of the transistor 61 to cause it to conduct, and generates at its collector a signal consisting of a negative rectangular pulse which causes the monostable multivibrator 67 to emit a signal constituted by a negative rectangular wave of duration dependent on its time constant. The time constant of the multivibrator 67 is adjusted by the resistor 102 in accordance with the inevitable delay in the opening of the contacts of the remote control switch 38 of FIG. 1 relative to the falling front of the positive rectangular wave which constitutes the control signal fed to the coil 37 by the blocking circuit 34 of FIG. 1. Consequently, a negative rectangular wave signal is generated at the output of the multivibrator 67, having its falling front lagging behind the positive rectangular wave which constitutes the control signal present at the terminal 49. In addition, the rising front of this rectangular wave slightly leads the opening of the remote control switch, such that the ionisation signals are determined when it is certain that the remote control switch 38 is closed.

This negative rectangular wave signal passes via the conductor 69 and resistor 70 to the base of the transistor 71, which normally conducts, so blocking it and generating at its collector a positive rectangular wave signal.

This positive rectangular wave signal passes through the conductors 73 and 74 to one input of the flip-flop 75, causing it to pass into its other stable state, in which it feeds an activation signal through the line 92 to one input of the coincidence gate 94. The same positive rectangular wave signal passes through the conductors 73 and 78 to one input of the coincidence gate 79, which is thus made to let any signals pass which reach its other input through the conductor 80. The conductor 80 transmits the negative rectangular pulses emitted by the squaring amplifier 81 when pulses are present at its input terminal 82 which have arrived from the block 29 of FIG. 1 via the line 41, because of the presence of ionisation pulses at the intermediate terminal 23 between the resistors 20 and 21 of FIG. 1.

When the aforesaid rectangular wave signal is present at the input of the gate 79 connected to the conductor 78, the first rectangular pulse from the conductor 80 is transmitted to the output of said coincidence gate 79, and passes through the conductor 93 to one input of the coincidence gate 94, which transmits it to its output if its second input is receiving, from the conductor 92, the positive rectangular wave signal emitted by the flip-flop 75 in its other stable state. The signal from the gate 94 is fed through the conductor 95 to the two inputs of the inverter 96, and from this latter is passes to one input of the coincidence gate 77 provided for eliminating any signal disturbances. The signal is then fed to the output of the gate 77 if the rectangular wave signal from the conductors 76 and 73 is present at its other input. The output signal of the gate 77 passes via the decoupling resistor 99 to the output terminal 100, which is connected to the line 46 and to the second counting means 47 of FIG. 1. Any signal present at the terminal 100 indicates the existence of ionisation of the gas between the electrodes of the sparking plug 17 of FIG. 1, in the absence of any spark at the sparking plug. The counting means 47 receive the signal and add it to any other ionisation signals previously totalled.

The first pulse from the terminal 82 is fed to the output terminal 100, and the same first pulse is also fed from a second output of the squaring amplifier 81 via the conductor 83 to the differentiating circuit comprising the capacitor 84 and resistor 87, which converts it into a pulse signal constituted by a negative pulse corresponding to the falling front of the rectangular pulse and a positive pulse corresponding to the rising front of the same rectangular pulse. The diode 85 allows only the positive pulse to pass, which acts on the base of the transistor 86, causing it to conduct and generating at its collector a signal consisting of a negative rectangular pulse. This latter signal passes via the conductor 91 to the second input of the flip-flop 75, to return it to its first stable state, so that this flip-flop ceases to feed the activation signal to the logic gate 94, which thus ceases operation. Consequently, other pulses subsequent to the first, which can be transmitted by the coincidence gate 79 until its input connected to the conductor 78 contains the rectangular wave signal which is a function of the control signal, are not transmitted to the coincidence gate 94 and do not appear at the output terminal 100. The counting means 47 therefore receive only the first of any ionisation pulses generated during the time period in which the engine effects the passive cycles, so that each signal counted indicates the presence of spontaneous ignition during the relative measurement stage.

If no pulse appears at the terminal 82 during a measurement stage, this means that during the period in which the sparking plug 17 was disconnected there was no spontaneous ignition, and therefore no signal reaching the terminal 100 and the counter means 47, whereas a signal is fed to the counter means 45 from the terminal 58 during every measurement stage.

We claim:

1. An instrument for measuring spontaneous ignition in a cylinder of an internal combustion engine provided with an ignition system arranged to generate high voltage to be fed intermittently to a sparking plug housed in said cylinder in order to generate mixture ignition sparks for effecting the so-called active cycles of the cylinder being checked, means being provided for blocking the intermittent application of said high voltage to the sparking plug in order to effect the so-called passive cycles of the cylinder being checked, there being connected to said sparking plug a direct current medium voltage generator for supplying the sparking plug, which then allows current to pass each time the gas present between its electrodes is ionized as a result of mixture combustion, there being provided means for detecting said current transmissions, adaptor means for transforming the detected current transmissions into corresponding pulses of predetermined form and amplitude, a control circuit for receiving said pulses and arranged to deliver at each predetermined number thereof a control signal of predetermined duration for said blocking means, first selector means associated with said control circuit for causing said predetermined number of pulses to correspond with a required number of active cycles of the cylinder being checked, and second selector means associated with said control circuit for causing said predetermined duration of the control signal to correspond to a required number of passive cycles of the cylinder being checked during a spontaneous ignition measurement stage, said instrument comprising a logic gate unit operationally connected to said adaptor means and to said control circuit in such a manner as to receive said pulses and said control signals, said logic gate unit responding to said control signals in such a manner as to be activated to operate for their entire predetermined duration, and to emit for each of them a first counting signal which indicates that one spontaneous ignition measurement stage has been effected, and also responding to each set of pulses received during its activation periods in such a manner as to emit a second counting signal which indicates the existence of spontaneous ignition during a measurement stage, there being associated with said logic gate unit first counter means able to total said first counting signals in order to provide an indication of the number of measurement stages effected, and second counter means able to total said second counting signals in order to provide an indication of the number of measurement stages in which spontaneous ignition has occurred.

2. An instrument as claimed in claim 1, wherein said logic gate unit comprises at least one first and one second coincidence gate, and comprises a flip-flop, a first input of the first coincidence gate being operationally connected to said control circuit by way of first processing elements arranged to generate a signal which is a function of said control signal, a second input of said coincidence gate being operationally connected to said adaptor means, a first input of said flip-flop being operationally connected to said control circuit by way of said first processing elements, a second input of said flip-flop being operationally connected to said adaptor means by way of second processing elements arranged to convert each pulse signal from said adaptor means into a double pulse signal, one input of said second coincidence gate being connected to the output of the first coincidence gate, and the other input of the second coincidence gate being connected to the output of said flip-flop, the output of said second coincidence gate being operationally connected to said second counter means.

3. An instrument as claimed in claim 2, wherein said first processing elements are constituted by a first transistor acting as an inverter, with its base operationally connected to said control circuit and its collector operationally connected to said first counter means, a first monostable multivibrator with its input operationally connected to the collector of said transistor and its output operationally connected by way of differentiating means comprising a capacitor and a resistive element to the base of a second transistor functioning as an inverter, and a second monostable multivibrator with its input operationally connected to the collector of the second transistor and its output operationally connected to said first input of the first coincidence gate and also operationally connected to said first input of the flip-flop.

4. An instrument as claimed in claim 2, wherein said second processing elements are constituted by a third transistor functioning as an inverter, with its base operationally connected by way of differentiating means comprising a capacitor and a resistive element to said adaptor means, and with its collector connected to the second said input of the flip-flop.

* * * * *